(12) United States Patent
Pugh et al.

(10) Patent No.: US 9,298,019 B2
(45) Date of Patent: Mar. 29, 2016

(54) SURFACE ENHANCED OPHTHALMIC LENS

(75) Inventors: Randall B. Pugh, Jacksonville, FL (US);
Zohra Fadli, Jacksonville, FL (US);
Sriram Natarajan, Bridgewater, NJ (US); Kevin Cooper, Flemington, NJ (US); Murty N. Vyakarnam, Bridgewater, NJ (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 83 days.

(21) Appl. No.: 13/094,870

(22) Filed: Apr. 27, 2011

(65) Prior Publication Data

US 2011/0273663 A1    Nov. 10, 2011

Related U.S. Application Data

(60) Provisional application No. 61/330,928, filed on May 4, 2010.

(51) Int. Cl.
*G02C 7/04*    (2006.01)

(52) U.S. Cl.
CPC ........................................ *G02C 7/04* (2013.01)

(58) Field of Classification Search
CPC .............. G02C 7/04; G02C 7/02; G02B 3/08; G02B 1/041; A61B 3/107; A61F 2/16; A61F 2/1613; A61F 2/1616; A61F 2/1618
USPC .......... 351/159.01, 159.02, 159.74, 247, 160; 359/742; 523/106; 425/542; 623/6.11, 623/6.13, 6.19, 6.25, 6.28, 6.29, 6.59
See application file for complete search history.

(56) References Cited

U.S. PATENT DOCUMENTS

| | | | |
|---|---|---|---|
| 2,196,066 A | 4/1940 | Feinbloom |
| 2,393,266 A | 1/1946 | Riddell |
| 2,989,894 A | 6/1961 | Gordon |
| 3,228,741 A | 1/1966 | Becker |
| 3,507,566 A | 4/1970 | Knapp |
| 4,055,378 A | 10/1977 | Feneberg et al. |
| 4,890,911 A | 1/1990 | Sulc et al. |
| 4,994,080 A | 2/1991 | Shepard |
| 5,009,497 A | 4/1991 | Cohen |
| 5,044,742 A | 9/1991 | Cohen |
| 5,104,213 A | 4/1992 | Wolfson |
| 5,114,220 A | 5/1992 | Baude et al. |
| 5,349,394 A | 9/1994 | Freeman et al. |
| 5,408,281 A | 4/1995 | Zhang |

(Continued)

FOREIGN PATENT DOCUMENTS

| EP | 0622653 | * 11/1994 | ............... G02C 7/04 |
|---|---|---|---|
| EP | 1900503 A2 | 3/2008 | |

(Continued)

OTHER PUBLICATIONS

PCT International Search Report, dated Aug. 12, 2011, for PCT Int'l Appln. No. PCT/US2011/034290.

(Continued)

*Primary Examiner* — Thomas K Pham
*Assistant Examiner* — Jie Lei

(57) ABSTRACT

This invention discloses methods and apparatus for providing an ophthalmic lens with a textured pattern within an optic zone and an ophthalmic lens with a textured pattern within the optic zone.

6 Claims, 5 Drawing Sheets

(56) References Cited

U.S. PATENT DOCUMENTS

| | | |
|---|---|---|
| 5,500,695 A | 3/1996 | Newman |
| 5,521,656 A | 5/1996 | Portney |
| 5,657,108 A | 8/1997 | Portney |
| 5,936,704 A | 8/1999 | Gabrielian et al. |
| 6,024,448 A | 2/2000 | Wu et al. |
| 6,036,314 A | 3/2000 | Wolfson |
| 6,186,625 B1 | 2/2001 | Portney |
| 6,203,156 B1 | 3/2001 | Wu et al. |
| 6,527,389 B2 | 3/2003 | Portney |
| 6,554,424 B1 | 4/2003 | Miller et al. |
| 6,726,322 B2 | 4/2004 | Andino et al. |
| 6,779,888 B2 | 8/2004 | Marmo |
| 6,814,439 B2 | 11/2004 | Portney |
| 6,874,866 B2 | 4/2005 | Silverbrook |
| 6,886,936 B2 | 5/2005 | Marmo et al. |
| 6,957,891 B2 | 10/2005 | Fiala |
| 6,966,648 B2 | 11/2005 | Miller et al. |
| 7,080,905 B2 | 7/2006 | Marmo et al. |
| 7,249,849 B2 | 7/2007 | Marmo et al. |
| 7,320,587 B2* | 1/2008 | Goodenough et al. ........ 425/542 |
| 7,404,637 B2 | 7/2008 | Miller et al. |
| 7,404,638 B2 | 7/2008 | Miller et al. |
| 7,591,556 B2 | 9/2009 | Rosenthal |
| 7,625,598 B2 | 12/2009 | Sharma et al. |
| 7,628,810 B2 | 12/2009 | Christie et al. |
| 7,858,156 B2 | 12/2010 | Crosby et al. |
| 7,878,650 B2 | 2/2011 | Fritsch et al. |
| 7,978,416 B2 | 7/2011 | Crosby et al. |
| 8,087,777 B2 | 1/2012 | Rosenthal |
| 2001/0013921 A1 | 8/2001 | Wu et al. |
| 2003/0117577 A1* | 6/2003 | Jones et al. .................. 351/164 |
| 2005/0078275 A1 | 4/2005 | Borden et al. |
| 2007/0154522 A1 | 7/2007 | Chow et al. |
| 2008/0002149 A1 | 1/2008 | Fritsch et al. |
| 2008/0099658 A1 | 5/2008 | Srinivas |
| 2008/0239237 A1* | 10/2008 | Ansell et al. .............. 351/160 R |
| 2009/0046329 A1 | 2/2009 | Tsuda |
| 2009/0206498 A1* | 8/2009 | Tepedino et al. ............ 264/1.36 |
| 2009/0244479 A1 | 10/2009 | Zanini |
| 2009/0303432 A1* | 12/2009 | Suzuki et al. ............. 351/160 R |
| 2010/0039613 A1 | 2/2010 | Sharma et al. |
| 2011/0116035 A1 | 5/2011 | Fritsch et al. |
| 2011/0194195 A1 | 8/2011 | Zalevsky et al. |

FOREIGN PATENT DOCUMENTS

| | | | |
|---|---|---|---|
| EP | 2116888 A1 | 11/2009 | |
| EP | 2116888 A4 | 9/2011 | |
| JP | 6324292 A | 11/1994 | |
| JP | 2004510200 A | 4/2004 | |
| JP | 2010508173 A | 3/2010 | |
| JP | 2010508547 A | 3/2010 | |
| TW | 200916307 A | 4/2009 | |
| WO | WO 9724639 * | 7/1997 | ............... G02C 7/04 |
| WO | WO 9724639 A1 | 7/1997 | |
| WO | WO0227389 A1 | 4/2002 | |
| WO | WO2008/054791 A3 | 5/2008 | |
| WO | WO2008087859 A1 | 7/2008 | |

OTHER PUBLICATIONS

PCT International Search Report, dated Aug. 11, 2011, for PCT Int'l Appln. No. PCT/US2011/034290.

* cited by examiner

SURFACE ENHANCED OPHTHALMIC LENS

RELATED APPLICATIONS

This application claims priority to Provisional U.S. Patent Application Ser. No. 61/330,928, filed on May 4, 2010.

FIELD OF USE

This invention describes an ophthalmic lens with one or more textured surfaces and, more specifically, in some embodiments, a contact lens with a concentric patterned textured convex surface.

BACKGROUND

Traditionally an ophthalmic device, such as a contact lens included a biocompatible material with a corrective, cosmetic or therapeutic quality. A contact lens, for example, can provide one or more of: vision correcting functionality; cosmetic enhancement; and therapeutic effects. Each function is provided by a physical characteristic of the lens. A design incorporating a refractive quality into a lens can provide a vision corrective function. A pigment incorporated into the lens can provide a cosmetic enhancement. An active agent incorporated into a lens can provide a therapeutic functionality.

The sensitive nature of an ophthalmic area on a human has resulted in comfort being an important characteristic of a lens. Various lens materials are often associated with varying levels of comfort. In addition, an industry has been developed for ophthalmic drops and additives to lenses to address the comfort issue.

Another important quality of a lens is the optical quality of a lens which influences how well an ophthalmic lens wearer will see while wearing a particular lens. Traditionally, a lens material as well as a lens design may affect the experience of an ophthalmic lens wearer while utilizing the lenses.

Although an experience of wearing ophthalmic lenses has made advancements in regard to comfort and optical quality, there still exists a need to further improve the experience of an ophthalmic lens wearer. New materials and ophthalmic solutions introduce many variables which are not always easy to quantify. In addition, new materials and solutions, although beneficial, often require significant amounts of time and resources in order to receive government approvals and be presented to a lens wearer.

Some designs of contact lenses have included different characteristics of a convex surface and a concave surface. For example, it has been known to have a contact lens with one radius of curvature on each of the front optical surface and another radius of curvature on the back surface of the lens. One disadvantage of this prior art approach is that light rays passing through the peripheral areas of the lens tend to focus in the eye in front of those passing through the center of the lens. This prior art approach restricts its depth-of-focus or field, and the quality of the optical image formed.

Other prior art examples include a multifocal contact lens having a spherical curve in the center region of the concave surface and an aspheric curve which surrounds the center spherical region. A disadvantage of this contact lens design is the use of corrective aspheric radii, which are difficult to measure and manufacture in practice.

SUMMARY

Accordingly, the present invention includes an ophthalmic device, such as a contact lens, with an improved design for enhancing the experience of the contact lens wearer. Generally, according to the present invention, a contact lens is formed with a carefully controlled texture on the lens surface. The texture is included across an optic zone of the contact lens. In some embodiments, the texture is formed with dimensions conducive to increasing the wettability of the lens surface. Some embodiments are also useful to manage a pattern of tear fluid on the lens surface.

In another aspect, some embodiments include a texture pattern that increases an uptake of beneficial proteins thereby increasing a comfort level associated with wearing the lens.

Accordingly, some embodiments of the present invention include an ophthalmic lens cast molded from a reactive monomer mix. Lenses are formed via the control of actinic radiation to which the reactive monomer mixture is exposed.

DETAILED DESCRIPTION OF THE INVENTION

Figure 1A:
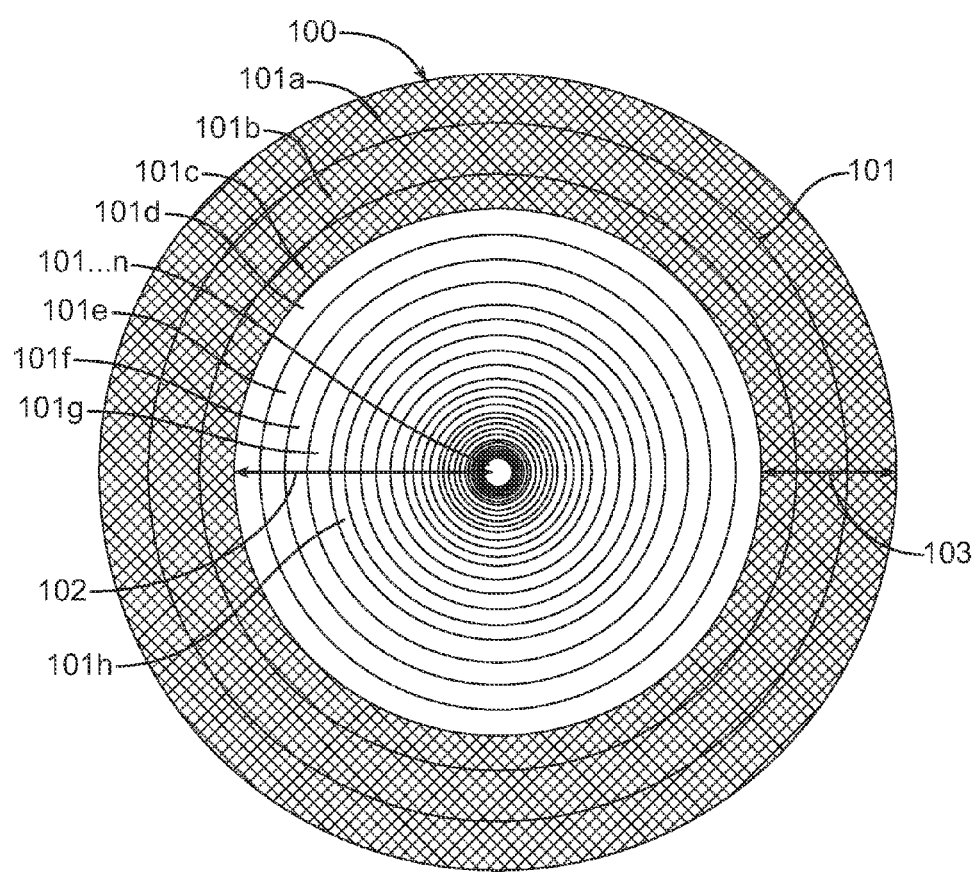
FIG. 1A illustrates an exemplary embodiment of an ophthalmic lens with a surface texture.

The present invention includes biomedical devices, such as ophthalmic lenses and in particular, the present invention includes an ophthalmic lens with an Energy Source incorporated into a biomedical device, such as an ophthalmic lens. The description of both preferred and alternative embodiments are exemplary embodiments only, and it is understood that to those skilled in the art that variations, modifications and alterations may be apparent. It is therefore to be understood that said exemplary embodiments do not limit the scope of the underlying invention.

GLOSSARY

In this description and claims directed to the presented invention, various terms may be used for which the following definitions will apply:

Lens: As used herein "lens" refers to any ophthalmic device that resides in or on the eye. These devices can provide optical correction or may be cosmetic. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses are made from silicone elastomers or hydrogels, which include but are not limited to silicone hydrogels, and fluorohydrogels.

Lens Forming Mixture: As used herein, the term "lens forming mixture" or "Reactive Mixture" or "RMM" (reactive monomer mixture) refers to a monomer or prepolymer material which can be cured and crosslinked or crosslinked to form an ophthalmic lens. Various embodiments can include lens forming mixtures with one or more additives such as: UV blockers, tints, photoinitiators or catalysts, and other additives one might desire in an ophthalmic lenses such as, contact or intraocular lenses.

Optic Zone: As used herein, the term "optic zone" refers to an area of an ophthalmic lens through which an ophthalmic lens wearer sees while wearing the ophthalmic lens on, near or in the eye in a normally prescribed fashion.

Peripheral Zone: As used herein, the term "peripheral zone" or "non-optic zone" refers to an area of an ophthalmic lens outside of the optic zone of the ophthalmic lens, and therefore outside of a portion of the ophthalmic lens through which a lens wearer sees while wearing the ophthalmic lens on, near or in the eye in a normally prescribed fashion.

In general, the present invention includes an ophthalmic lens with a textured surface. In some embodiments, an ophthalmic device includes an optic zone through which a wearer of the lens would see. A textured pattern may be located one or both of within the optic zone and exterior to the optic zone. Other embodiments can include a mold part used for cast molding an ophthalmic lens wherein the mold part includes a relief of a pattern to be formed on the ophthalmic lens. Still further embodiments include steel molding that may be utilized to form plastic mold parts for cast molding an ophthalmic lens.

Ophthalmic Lens Device

Referring now to FIG. 1A, a top down view of an exemplary ophthalmic lens 100 according to the present invention is illustrated. The lens 100 includes a patterned texture 101 formed into the lens 100. In some embodiments, and as illustrated, the patterned texture 101 includes a series of concentric or generally concentric indentations or grooves 101a-101h and so on to 101 . . . n wherein n is a number of concentric circular grooves. The grooves 101a-101 . . . n of the patterned texture 101 are formed in the surface of the soft lens material at a depth and spacing that increases wettability of the surface and does not obstruct normal vision through the lens.

The expression "generally concentric" grooved pattern is meant to designate one or more spiral pattern that includes a continuous groove that spirals about a center point. At a given cross section, the spiral pattern may appear as a concentric circle pattern; however, a spiral is contiguous groove or indentation. In some embodiments, multiple spiral patterns with a same or proximate center point may be utilized.

Accordingly, the patterned texture 101 may continue through a portion or the entirety of an optic zone 102 of the lens 100. In addition, the patterned texture 101 may be present in a portion or the entirety of a peripheral zone 103 of the lens 100.

Figure 1B:
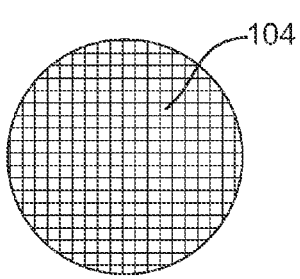
FIG. 1B illustrates an exemplary surface texture including a cross hatch pattern.
Figure 1C:
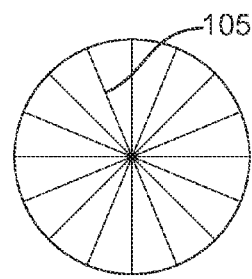
FIG. 1C illustrates an exemplary surface texture including a radial pattern.

FIG. 1A illustrates some specific embodiments with concentric circles; FIG. 1B and FIG. 1C illustrate additional embodiments with various textured patterns 104-105. FIG. 1B illustrates a textured pattern 104 that is generally a cross hatch pattern and FIG. 1C includes radial channels or grooves 105 from a center point. Other patterns are also within the scope of the present invention, including a stochastic "pattern". Generally, any constraints of a shape of patterned texture 101a-101 . . . n, 104, 105 may be related to a manufacturing method and lens material. For example, a cast molding manufacturing process may be more compatible with a concentric textured pattern and a cross hatch or stochastic pattern may be more available via a freeform manufacturing processes.

According to the present invention, a patterned texture 101a-101 . . . n, 104, 105 includes grooves or indentations of sufficient depth and frequency to improve wettability of a lens surface (as described more completely below) while a lens is worn by a lens wearer and includes a depth shallow enough to allow a lens wearer to see through the lens clearly.

Traditionally, any surface modifications have been limited to areas outside of the optic zone. Such designs adhered to the generally accepted notion that a human eye will perceive the aberrations on the surface of the lens introduced by the patterned texture 101a-101 . . . n, 104, 105 or that the patterned texture 101a-101 . . . n, 104, 105 will introduce artifacts into the vision experience, such as rainbows, rings, or vision distortion. However, according the present invention, a patterned texture 101a-101 . . . n, 104, 105, may be introduced into an optic zone without any substantial adverse affect to vision, and in some embodiments, an improvement in vision. By way of non-limiting explanation, it is theorized that a lens wearer's own tear fluid fills the pattern and provides a satisfactory or improved optical vision experience. In addition, the tear fluid provides an improved wearer experience.

In addition, in some embodiments, a patterned surface texture 101a-101 . . . n, 104, 105 provides more surface area for uptake of beneficial proteins from the tear fluid as compared to a smooth surface. The increase in surface area improves a comfort level associated with wearing an ophthalmic lens 100 with a patterned texture 101a-101 . . . n, 104, 105.

Figure 2:
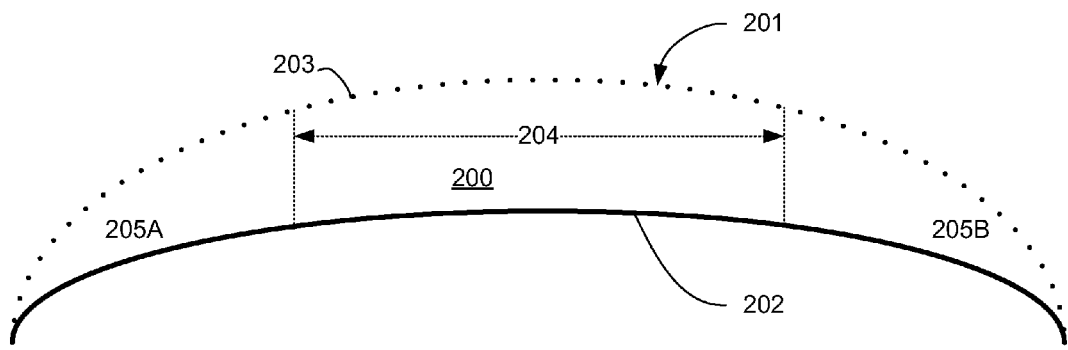
FIG. 2 illustrates cross section of an exemplary embodiment of an ophthalmic lens with a surface.

Referring now to FIG. 2, a cross section of an ophthalmic lens 200 according to the present invention is illustrated. The lens 200 has a back curve or concave surface 202 and a front curve or convex surface 203. According to the present invention, the convex surface 203 includes a textured pattern 201 within an optic zone 204 area. In some embodiments, the textured pattern 201 may also be in an area outside the optic zone 205A-205B.

Figure 3:
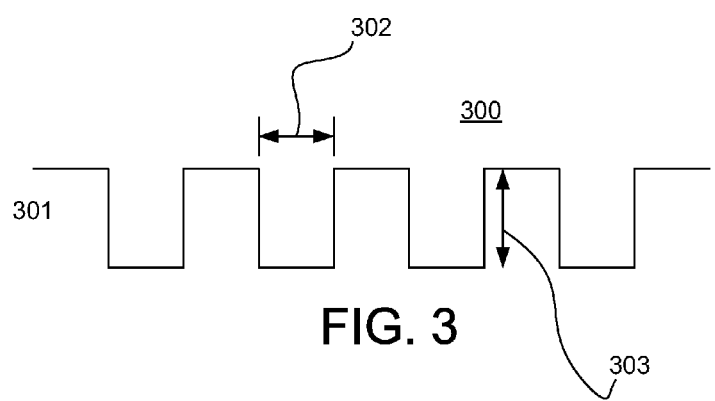
FIG. 3 illustrates a close up of some dimensions of a textured pattern.

Referring now to FIG. 3, a close up view of a textured pattern according to some embodiments is illustrated. The textured pattern 300 generally includes multiple channels or grooves or other geometric indentation with a depth 303 and a width 302. In some embodiments, a depth is two microns or less. Depending upon a material and the structural shape of a textured pattern, some embodiments may result in increased comfort with a textured pattern of two microns or less and some preferred embodiments include a simple digital structural shape with a depth of five hundred nanometers (0.5 microns) or less. The textured pattern illustrated in FIG. 3 is generally conducive to patterns with groove type artifacts, other patterns are also within the scope of the invention.

Figure 4:
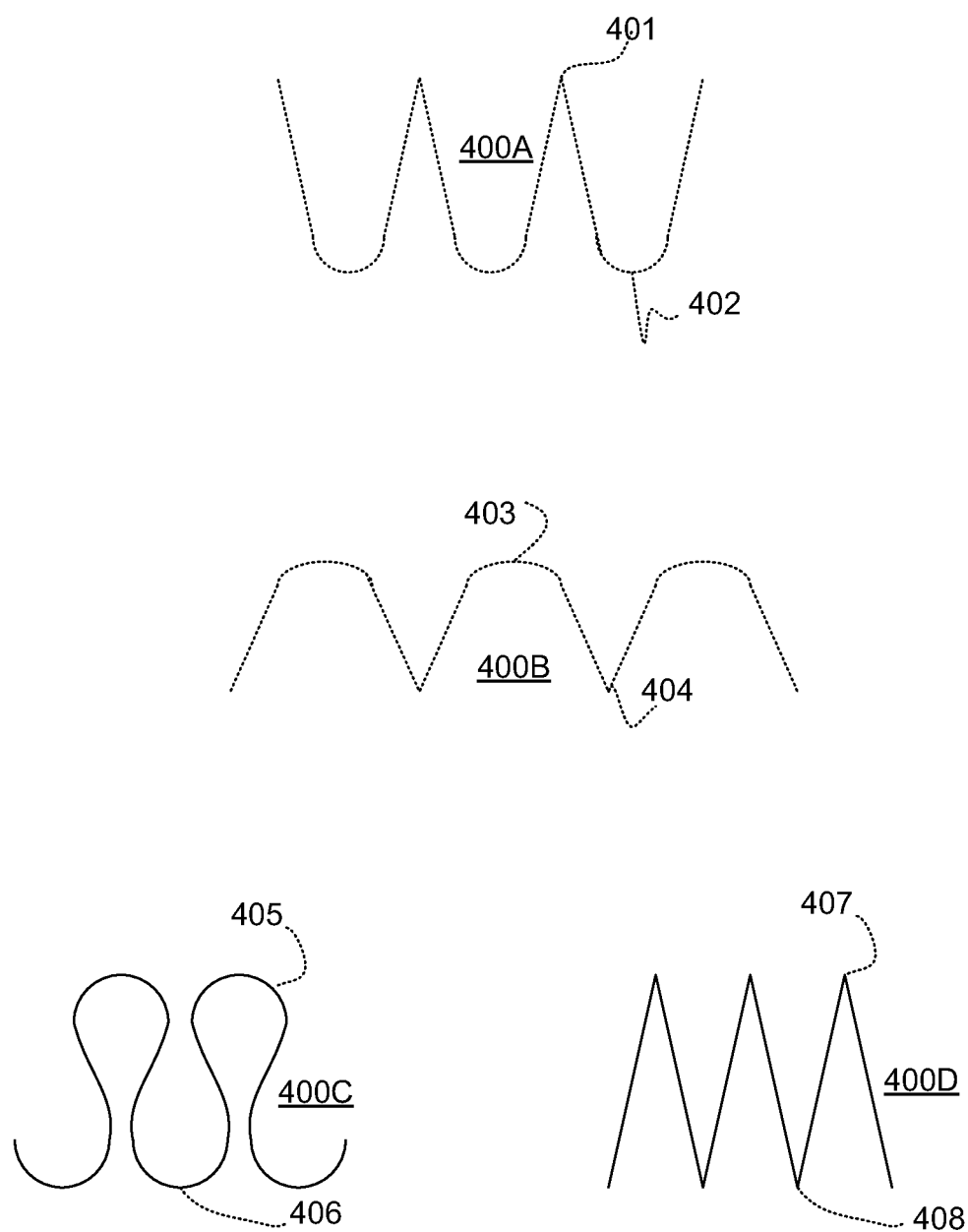
FIG. 4 illustrates exemplary patterns of a patterned texture.

Referring now to FIG. 4, exemplary structural shapes included within a textured pattern are illustrated. In some embodiments, a textured pattern 400A may include a relatively pointed top portion 401 which is situated along an exterior most area of a textured pattern 400A and a generally rounded portion 402 along a more interior portion of a textured pattern 400A.

Another textured pattern 400B includes a relatively rounded top portion 403 situated along an exterior most area of a textured pattern 400B and a generally pointed portion 404 along a more interior portion of a textured pattern 400B.

Still other embodiments may include textured pattern 400C including a relatively rounded top portion 405 situated along an exterior most area of a textured pattern 400C and a generally rounded portion 406 along a more interior portion of a textured pattern 400C.

Additional embodiments may include textured pattern 400D including a relatively pointed top portion 407 situated along an exterior most area of a textured pattern 400D and a generally pointed portion 408 along a more interior portion of a textured pattern 400D.

Figure 5:
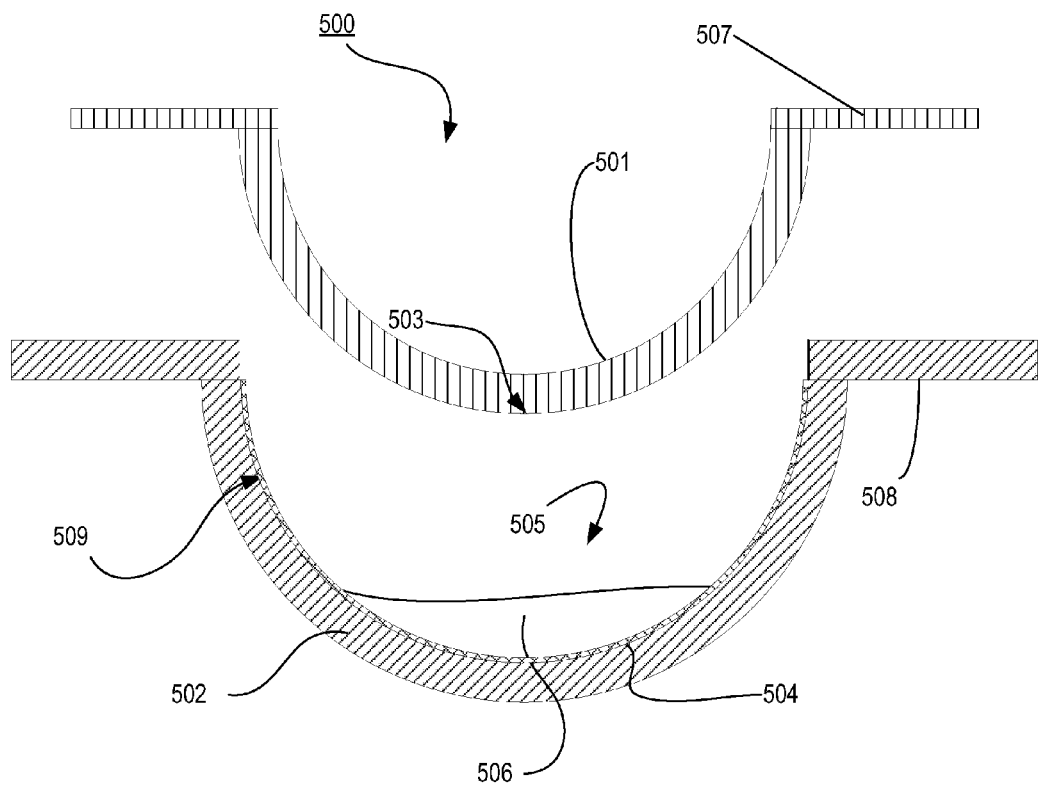
FIG. 5 illustrates an exemplary mold system with two mold parts for forming a lens according to the present invention.

Referring now to FIG. 5, a diagram of an exemplary mold for an ophthalmic lens is illustrated. As used herein, the terms "mold" and "mold assembly" refer to a form 500 having a cavity 505 into which a lens forming mixture can be dispensed such that upon reaction or cure of the lens forming mixture 506 an ophthalmic lens of a desired shape is produced. The molds and mold assemblies 500 of this invention are made up of more than one "mold parts" or "mold pieces" 501-502. The mold parts 501-502 can be brought together such that a cavity 505 is formed between the mold parts 501-502 in which a lens can be formed. This combination of mold parts 501-502 is preferably temporary. Upon formation of the lens, the mold parts 501-502 can again be separated for removal of the lens.

At least one mold part 501-502 has at least a portion of its surface 503-504 in contact with the lens forming mixture such that upon reaction or cure of the lens forming mixture that surface 503-504 provides a desired shape and form to the portion of the lens with which it is in contact. The same is true of at least one other mold part 501-502.

Thus, for example, in a preferred embodiment a mold assembly 500 is formed from two parts 501-502, a female concave piece (front piece) 502 and a male convex piece (back piece) 501 with a cavity formed between them. The portion of the concave surface 504 which makes contact with lens forming mixture has the curvature of the front curve of an ophthalmic lens to be produced in the mold assembly 500 and is sufficiently smooth and formed such that the surface of an ophthalmic lens formed by polymerization of the lens forming mixture which is in contact with the concave surface 504 is optically acceptable.

According to the present invention, one or both of the mold parts 501-502 includes a textured pattern 509 on a surface that comes into contact with lens forming mixture 506 deposited into the mold cavity 505. As illustrated, the textured pattern 509 is included on the concave surface 504. The mold textured pattern 509 becomes a relief of a pattern imparted into a lens formed by the mold system 500. A lens formed from a mold part as illustrated will have a textured pattern on a convex front curve surface of the ophthalmic lens. The textured pattern may be formed into the mold part 502, via an injection mold, a lathing process, a laser ablation process or other method of forming plastic.

In some embodiments, the front mold piece 502 can also have an annular flange integral with and surrounding circular circumferential edge 508 and extends from it in a plane normal to the axis and extending from the flange (not shown).

The back mold piece 501 has a central curved section with a convex surface 503 and circular circumferential edge 507, wherein the portion of the convex surface 503 in contact with the lens forming mixture has the curvature of the back curve of an ophthalmic lens to be produced in the mold assembly 500 and is sufficiently smooth and formed such that the surface of an ophthalmic lens formed by reaction or cure of the lens forming mixture in contact with the back surface 503 is optically acceptable. Accordingly, the inner concave surface 504 of the front mold piece 502 defines the outer surface of the ophthalmic lens, while the outer convex surface 503 of the base mold half 501 defines the inner surface of the ophthalmic lens.

Figure 6:
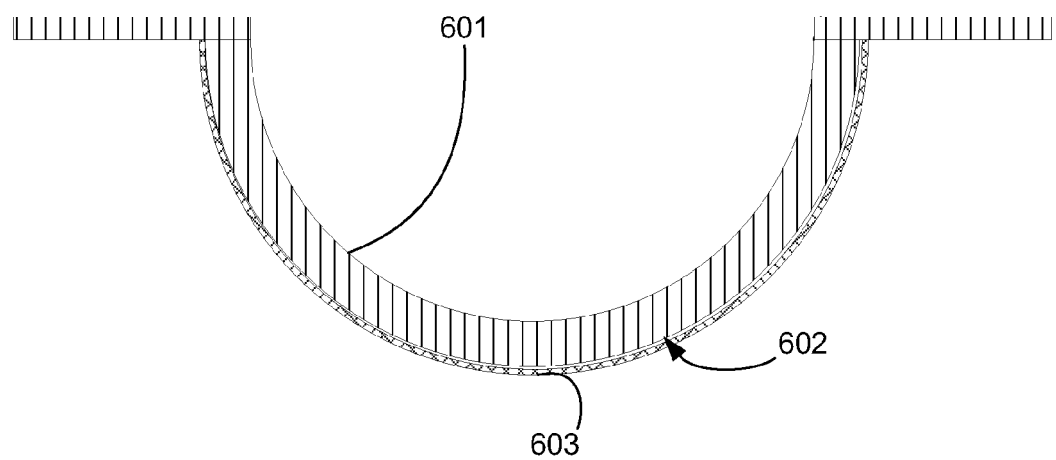
FIG. 6 illustrates an exemplary mold part with a convex surface for forming a lens according to the present invention.

Referring now to FIG. 6, in some embodiments, a mold part 601 may include a convex surface with a textured pattern 603 imparted into the convex surface 602. In such embodiments, an ophthalmic lens formed with the mold part 601, will include a textured pattern on a concave back curve surface.

Preferred embodiments of a mold material include polyolefin; cyclic olefin; alicyclic polyolefin and cyclic olefin polymers (sometimes referred to as "COC"); including, in some embodiments polyolefins and COCs.

In some preferred methods of making molds 500 according to the present invention, injection molding is utilized according to known techniques, however, embodiments can also include molds fashioned by other techniques including, for example: lathing, diamond turning, or laser cutting.

Typically, lenses are formed on at least one surface of both mold parts 501-502. However, if need be one surface of the lenses may be formed from a mold part 501-502 and the other lens surface can be formed using a lathing method, or other methods.

As used herein "lens forming surface" means a surface 503-504 that is used to mold a lens. In some embodiments, any such surface 503-504 can have an optical quality surface finish, which indicates that it is sufficiently smooth and formed so that a lens surface fashioned by the polymerization of a lens forming material in contact with the molding surface is optically acceptable. Further, in some embodiments, the lens forming surface 503-504 can have a geometry that is necessary to impart to the lens surface the desired optical characteristics, including without limitation, spherical, aspherical and cylinder power, wave front aberration correction, corneal topography correction and the like as well as any combinations thereof.

In some embodiments, a Reactive Mixture which forms a lens material can include a silicone containing component. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

Suitable silicone containing components include compounds of Formula I

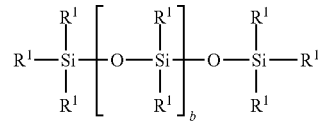

where $R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one R¹ comprises a monovalent reactive group, and in some embodiments between one and 3 R¹ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment b is zero, one R¹ is a monovalent reactive group, and at least 3 R¹ are selected from monovalent alkyl groups having one to 16 carbon atoms, and in another embodiment from monovalent alkyl groups having one to 6 carbon atoms. Non-limiting examples of silicone components of this embodiment include 2-methyl-, 2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another embodiment, b is 2 to 20, 3 to 15 or in some embodiments 3 to 10; at least one terminal R¹ comprises a monovalent reactive group and the remaining R¹ are selected from monovalent alkyl groups having 1 to 16 carbon atoms, and in another embodiment from monovalent alkyl groups having 1 to 6 carbon atoms. In yet another embodiment, b is 3 to 15, one terminal R¹ comprises a monovalent reactive group, the other terminal R¹ comprises a monovalent alkyl group having 1 to 6 carbon atoms and the remaining R¹ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another embodiment b is 5 to 400 or from 10 to 300, both terminal R¹ comprise monovalent reactive groups and the remaining R¹ are independently selected from monovalent alkyl groups having 1 to 18 carbon atoms which may have ether linkages between carbon atoms and may further comprise halogen.

In one embodiment, where a silicone hydrogel lens is desired, the lens of the present invention will be made from a reactive mixture comprising at least about 20 and preferably between about 20 and 70 percent weight silicone containing components based on total weight of reactive monomer components from which the polymer is made.

Although invention may be used to provide hard or soft contact lenses made of any known lens material, or material suitable for manufacturing such lenses. More preferably, the lenses are made of monomers containing hydroxy groups, carboxyl groups, or both or be made from silicone-containing polymers, such as siloxanes, hydrogels, silicone hydrogels, and combinations thereof. Material useful for forming the lenses of the invention may be made by reacting blends of macromers, monomers, and combinations thereof along with additives such as polymerization initiators. Suitable materials include, without limitation, silicone hydrogels made from silicone macromers and hydrophilic monomers.

CONCLUSION

The present invention, as described above and as further defined by the claims below, provides methods of processing ophthalmic lenses and apparatus for implementing such methods, as well as ophthalmic lenses formed thereby.

We claim:

1. An ophthalmic device comprising:
   a lens having an optic zone and a peripheral zone;
   a convex front curve surface and a concave back curve surface; and
   a textured pattern formed into one or both of the convex front curve surface and the concave back curve surface at a depth and spacing that increases the wettability of the surface thereby improving comfort and does not obstruct normal vision through the device or alter the focal power of the lens, the textured pattern is a non-periodic structure and is formed at least within the optic zone and comprises a single, continuous groove that spirals about a center point formed in the convex front curve surface, wherein the single, continuous groove that spirals about a center point comprises a cross-sectional shape having a rounded top portion positioned along an exterior area of textured pattern and a pointed bottom portion positioned along an interior portion of the textured pattern.

2. The lens of claim 1, wherein the textured pattern is additionally formed within the peripheral zone.

3. The lens of claim 2 wherein the ophthalmic lens comprises a silicon hydrogel material.

4. The lens of claim 2 wherein the textured pattern comprises a depth of about two microns or less.

5. The lens of claim 2 wherein the textured pattern comprises a depth of about 0.5 microns or less.

6. The lens of claim 1 where the ophthalmic lens comprises at least one of: etafilcon, senofilcon, galyfilcon and narafilcon.

* * * * *